United States Patent [19]
Anderson

[11] Patent Number: 6,077,553
[45] Date of Patent: Jun. 20, 2000

[54] METHOD OF MAKING A PIZZA WITH THE CRUST BEING IN THE CENTER

[76] Inventor: Kent G. Anderson, 925 N. Griffin, Bismarck, N. Dak. 58501

[21] Appl. No.: 09/148,892

[22] Filed: Sep. 8, 1998

[51] Int. Cl.[7] .................................................... A21D 13/00
[52] U.S. Cl. ........................... 426/283; 426/94; 426/275; 426/496
[58] Field of Search .............................. 426/94, 274, 275, 426/283, 496

Primary Examiner—Lien Tran

[57] ABSTRACT

A method of making a pizza with the crust being in the center includes providing a thin layer of dough having first and second sides and further providing the traditional ingredients including tomato sauce, at least one cheese, meats, vegetables, and fruits; applying ingredients to the first side of the thin layer of dough; turning the thin layer of dough upon the first side upon a pan having a mesh surface; applying selected ingredients to the second side of the thin layer of dough; and evenly cooking the pizza on both sides with the dough forming a crust in the center and having the ingredients on both sides of the crust rather than on one side only.

11 Claims, No Drawings

METHOD OF MAKING A PIZZA WITH THE CRUST BEING IN THE CENTER

BACKGROUND OF THE INVENTION

This invention relates to a method of making a pizza with the crust being in the center so that the normal ingredients used to top the pizza are placed on both sides of the pizza.

Most pizzas are made with the crust being on the bottom and with the toppings being placed on top of the crust usually with a sauce being evenly spread about on the crust and then a layer of cheese or cheeses being spread over the sauce and finally meats and/or vegetables of various kinds being spread upon the layer of cheese. With some pizzas in addition to the cheese being spread upon the sauce, cheese is also spread about inside the crust. Other types of pizzas are of the kind where the crust is on the bottom, the top and all around with the ingredients being stuffed inside the crust similar to a pie.

One known prior art is a MULTI-LAYERED PIZZA PRODUCT, AND THE METHOD OF MAKING THE SAME, U.S. Pat. No. 5,720,998, which includes multiple dough layers and multiple ingredient layers with cheese or other ingredient layer being disposed between a middle portion of the pizza. A second dough layer supports an additional ingredient layer that includes tomato sauce, cheese and other traditional pizza topping ingredients.

Another known prior art is a PIZZA PIE WITH CONCENTRIC RINGS OF CRUST, U.S. Pat. No. 5,508,049, which includes a frame having a peripheral configuration and having a plurality of concentric cavities, and also includes dough being formed across the surface of the frame.

None of the prior art describes a method of making a pizza with the crust being in the center.

SUMMARY OF THE INVENTION

The present invention relates to a method of making a pizza with the crust being in the center includes a dough layer with tomato sauce being spread upon one side of the dough layer and with a layer of cheese or cheeses being spread over the tomato sauce and with additional ingredients such as meats and vegetables as selected by the consumer being spread over the layer of cheese or cheeses. After which, the pizza is turned over with the ingredients on one side of the pizza being placed faced down upon a mesh surface of a pan having a plurality of openings therethrough so that the ingredients including the cheese or cheeses do not stick to the surface of the pan, and with tomato sauce being spread entirely upon the other side of the dough layer and with a layer of cheese or cheeses being spread over the tomato sauce and with additional ingredients such as meats and vegetables as selected by the consumer being spread over the layer of cheese or cheeses. Once both sides of the dough layer is layered with the desired ingredients, the pizza and the pan with the mesh bottom surface is placed in a heating appliance which cooks both sides of the pizza evenly such as a toaster-like oven having heating elements above and below the pizza. Once cooked, the ingredients will not fall off the pizza.

One objective of the present invention is to provide a method of making a pizza with the crust being in the center which provides the consumer with essentially two pizzas in one.

Another objective of the present invention is to provide a method of making a pizza with the crust being in the center which provides the consumer with more ingredients with less crust.

Also, another objective of the present invention is to provide a method of making a pizza with the crust being in the center which has cavities throughout the crust in which an assortment of liquid sweeteners are added to the pizza.

Yet, another objective of the present invention is to provide a method of making a pizza with the crust being in the center which allows the consumer to have two different styles of pizza within one pizza.

Further objectives and advantages of the present invention will become apparent as the description proceeds.

DETAILED DESCRIPTION OF THE INVENTION

A method of making a pizza with the crust being in the center comprises the steps of providing a layer of dough which is patted or rolled out into a thin sheet which has two sides and which is placed upon a pan having a mesh bottom surface upon which the pizza is placed, the mesh bottom surface having a plurality of openings which substantially reduces the surface area upon which the pizza rests thus lessening the possibility of the pizza sticking to the mesh bottom surface, and also providing tomato sauce, at least one type of cheese and a selection of meats and/or vegetables and/or fruits all of which comprise the ingredients of the pizza.

The next step for making this pizza includes applying the tomato sauce to the exposed side of the layer of dough and then spreading a layer of cheese or cheeses over the tomato sauce covering the entire exposed side of the layer of dough. After which, the selected meats and/or vegetables are spread or scattered over the layer of at least one cheese. Any kinds of meats and/or vegetables as desired by the consumer can be applied to this one side of the pizza. After which, the pan with the mesh bottom surface is placed upon the top of the pizza over the first side of the layer of dough upon which is covered with the ingredients, and the pizza along with the pan is turned over with the mesh bottom surface of the pan now being on the bottom and the second side of the layer of dough not covered with any ingredients being exposed or facing upward.

As with the first side of the layer of dough, tomato sauce is spread evenly upon and essentially covering the entire second side of the dough. On top of the tomato sauce, a layer of at least one cheese is applied, and on top of the layer of at least one cheese, the selected meats and/or vegetables are applied in the same manner as the first side. The types of ingredients applied to the second side of the layer of dough can be the same as that applied to the first side of the layer of dough or they can be different. For best results, this pizza should be cooked in a toaster-like oven which has heating elements on top and on the bottom so that the pizza is evenly cooked on both sides at the same time. As the pizza is cooked, the layer of at least one cheese on the first side of the layer of dough melts and essentially bonds the meats and vegetables together on the bottom side of the pizza so that they won't fall off as the pizza is removed from the pan. The following examples demonstrates the different styles of pizzas that one can make.

EXAMPLE 1

A thin layer of dough was formed and the traditional ingredients including the tomato sauce, at least one cheese of the mozzarella type, and pepperoni were added to the first side of the layer of dough, and on the second side of the layer of dough, the same ingredients were added except instead of pepperoni, Canadian bacon and pineapple were added to essentially create two different pizzas within one pizza. The pepperoni side of the pizza was placed face down upon a mesh surface of a pan and the pizza was placed in a toaster-like oven; whereupon the pizza was evenly cooked on both sides with the dough being cooked into a flaky crust and forming the center of the pizza.

EXAMPLE 2

A thin layer of dough was formed and the traditional ingredients including the tomato sauce, at least one cheese of the mozzarella type, and sausage were added to the first side of the layer of dough, and on the second side of the layer of dough, the same ingredients were added except instead of sausage, hamburger, lettuce, slices of tomato, and taco seasoning were added to essentially create two different pizzas within one pizza. The sausage side of the pizza was placed face down upon a mesh surface of a pan and the pizza was placed in a toaster-like oven; whereupon the pizza was evenly cooked on both sides with the dough being cooked into a flaky crust and forming the center of the pizza.

EXAMPLE 3

A thin layer of dough was formed with a plurality of cavities therein for holding liquid artificial sweeteners and the traditional ingredients including the tomato sauce, at least one cheese of the mozzarella type, and bits of chicken were added to the first side of the layer of dough, and on the second side of the layer of dough, the same ingredients were added except instead of chicken, hamburger was added to essentially create two different pizzas within one pizza. The chicken side of the pizza was placed face down upon a mesh surface of a pan and the pizza was placed in a toaster-like oven; whereupon the pizza was evenly cooked on both sides with the dough being cooked into a flaky crust and forming the center of the pizza and having a plurality of cavities containing the liquid artificial sweeteners such as fruit juices including grape, cherry, strawberry, and apple to sweeten the pizza.

EXAMPLE 4

A thin layer of dough was formed and the traditional ingredients including the tomato sauce, at least one cheese of the mozzarella type, and slices of pepperoni were added to the first side of the layer of dough, and on the second side of the layer of dough, the same ingredients were added except instead of pepperoni, hamburger was added to essentially create two different pizzas within one pizza. In addition, edible figurines were scattered about inside the thin layer of dough, the figurines being essentially surprises and being made of candy such as gummy candies or being edible bread dough. The pepperoni side of the pizza was placed face down upon a mesh surface of a pan and the pizza was placed in a toaster-like oven; whereupon the pizza was evenly cooked on both sides with the dough being cooked into a flaky crust and forming the center of the pizza. For each bite of the pizza, the user would find an edible figurine which, in addition, to being made of candy also includes fruit juices and/or caramels and/or chocolates.

EXAMPLE 5

A thin layer of dough was formed and instead of the traditional ingredients being added separately to both sides of the thin layer of dough, the ingredients including the tomato sauce, at least one cheese of the mozzarella type, and slices of pepperoni were added such that the same ingredients were exposed on both sides of the layer of dough by means of inserting the ingredients into and through the dough with a conventional food utensil instead of placing the ingredients on the sides of the pizza. The pizza was placed in a toaster-like oven; whereupon the pizza was evenly cooked on both sides with the dough being cooked into a flaky crust and forming the center of the pizza around the inserted ingredients.

Various changes and departures may be made to the invention without departing from the spirit and scope thereof. Accordingly, it is not intended that the invention be limited to that specifically described in the specification but only as set forth in the claims.

What is claimed is:

1. A method of making a two-sided pizza comprises the steps of:

providing a layer of dough having first and second sides, and providing traditional ingredients of a pizza selected from a group consisting of tomato sauce, at least one cheese, and meats and vegetables;

applying said traditional ingredients to said first and second sides of said layer of dough; and cooking both sides of said pizza with said layer of dough forming a crust in a center of said pizza.

2. A method of making a two-sided pizza as described in claim 1, wherein the step of applying the ingredients to said first and second sides of said layer of dough further includes the steps of:

applying said traditional ingredients to said first side of said layer of dough;

turning said layer of dough upon a pan with said first side and said ingredients thereon being face down and said second side being exposed upwardly; and applying said traditional ingredients to said second side.

3. A method of making a two-sided pizza as described in claim 1, wherein the step of applying the ingredients to said first and second sides of said layer of dough further includes the step of inserting said traditional ingredients into and through said layer of dough such that said ingredients are exposed on both said first and said second sides thereof.

4. A method of making a two-sided pizza as described in claim 1, wherein the step of providing said traditional ingredients selected from a group consisting of pepperoni, chicken, hamburger, steak, sausage, Canadian bacon, and fish.

5. A method of making a two-sided pizza as described in claim 1, wherein the step of providing said traditional ingredients further includes providing fruits including pineapple and apple.

6. A method of making a two-sided pizza as described in claim 1, wherein the step of providing said layer of dough includes providing said layer of dough with a plurality of cavities disposed therein for holding an assortment of liquid sweeteners to sweeten said pizza.

7. A method of making a two-sided pizza as described in claim 6, wherein the step of cooking both sides of said pizza includes injecting a liquid sweetener into said cavities as said pizza is being cooked.

8. A method of making a two-sided pizza as described in claim 1, wherein the step of providing said layer of dough includes providing said layer of dough with a plurality of edible figurines randomly dispersed inside of said layer of dough.

9. A method of making a two-sided pizza as described in claim 1, wherein the step of turning said layer of dough upon a pan includes placing a pan having a mesh surface upon said first side with said mesh surface covering said first side of said pizza to substantially reduce the possibility of said pizza sticking to said pan and turning said pizza over upon said mesh surface to expose said second side of said pizza.

10. A method of making a two-sided pizza as described in claim 1, wherein the step of cooking said pizza includes cooking said pizza in a toaster oven having heating elements above and below said pizza.

11. A method of making a two-sided pizza as described in claim 10, wherein the step of cooking said pizza includes effectively cooking said pizza so that said at least one cheese melts and binds the other ingredients together to avoid the ingredients from falling off the side of said pizza facing downwardly.

* * * * *